Oct. 1, 1957  L. E. STEINMAN  2,808,119
CLUTCH CONTROLLING TRACTOR HITCH
Filed Dec. 8, 1954  3 Sheets-Sheet 1

Leo E. Steinman
INVENTOR.

BY *Clarence A. O'Brien*
and *Harvey B. Jacobson*
Attorneys

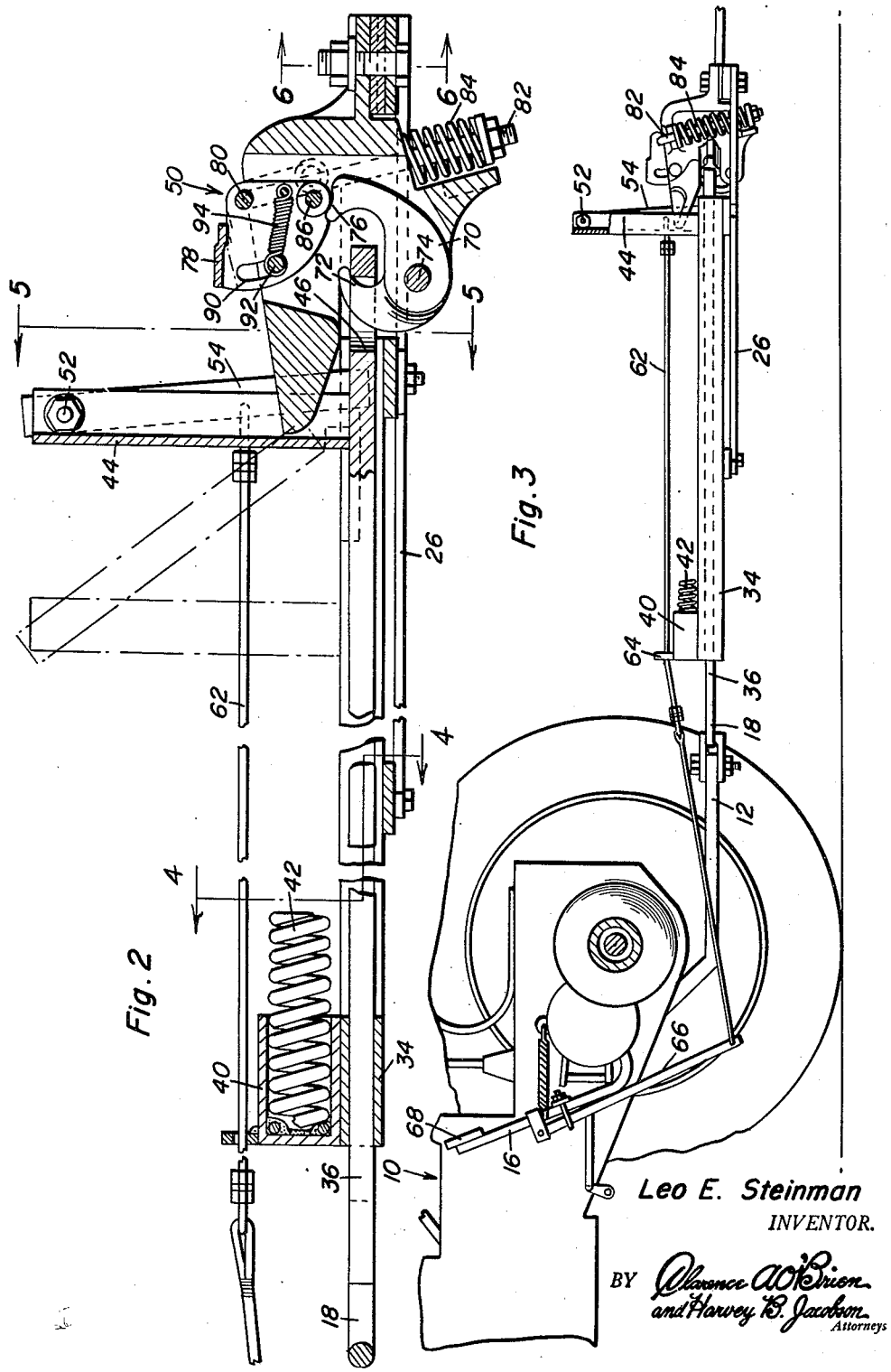

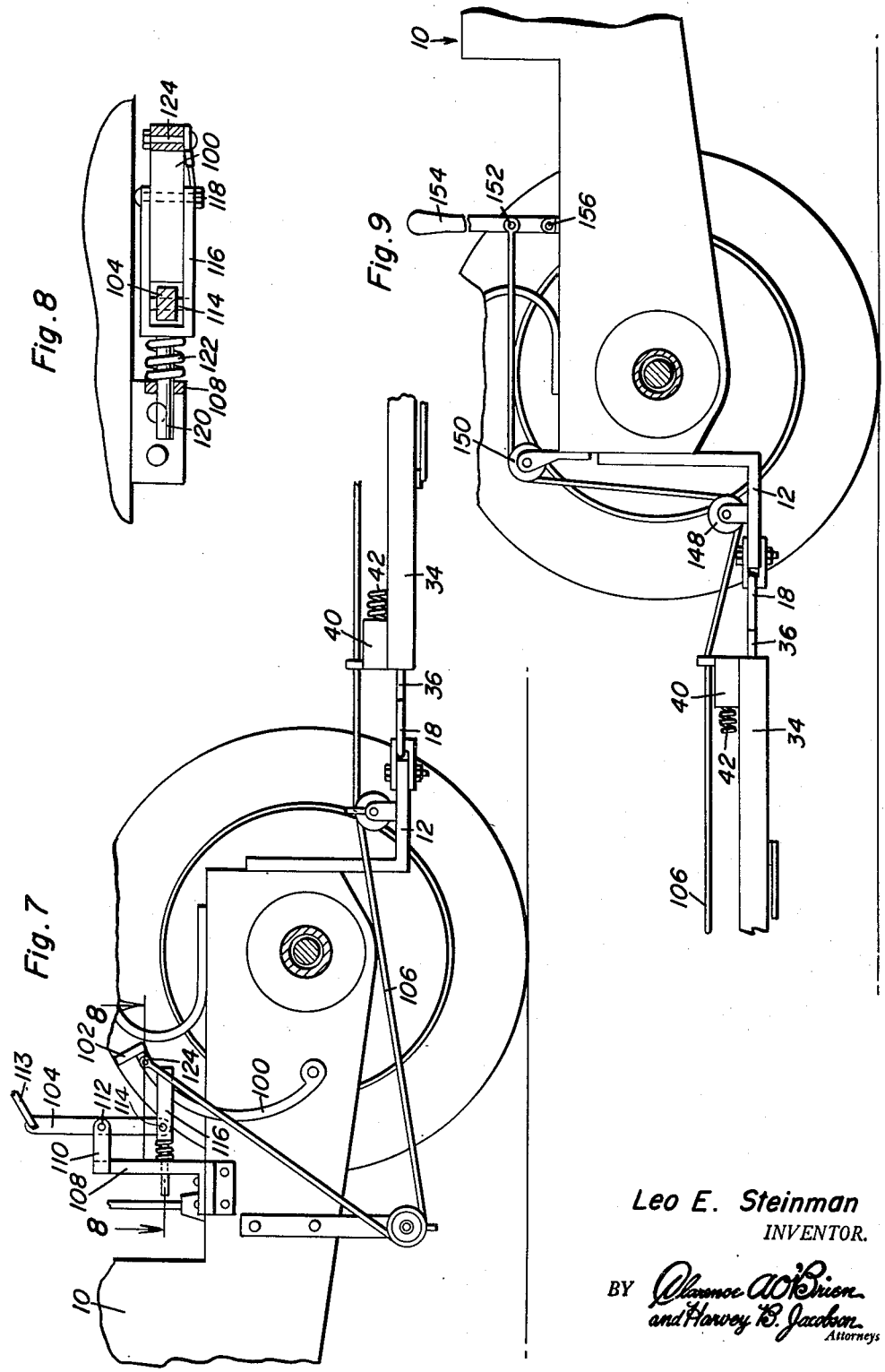

2,808,119

CLUTCH CONTROLLING TRACTOR HITCH

Leo E. Steinman, Carrington, N. Dak.

Application December 8, 1954, Serial No. 473,784

2 Claims. (Cl. 180—14.5)

This invention comprises novel and useful improvements in a hitch and more specifically relates to an automatic overload release hitch for connecting agricultural implements to tractors.

The primary object of this invention is to provide an automatically releasable coupling for connecting agricultural implements to a tractor whereby the coupling may be automatically released and the clutch of the tractor power plant may be disengaged when a predetermined overload is applied to the drawbar of the tractor by the implement being towed thereby.

An important object of this invention is to provide an automatic releasable coupling which will automatically activate the clutch control of the tractor to thereby disengage the clutch when an overload is applied to the drawbar through the hitch or coupling.

A still further object of the invention is to provide a safety attachment in conformance with the preceding objects which may be readily applied to conventional tractors, and which shall be very dependable in operation.

Yet another object of the invention is to provide a safety device as set forth in the above mentioned objects wherein the coupling engagement of the tractor to the implement being towed thereby will not be completely broken upon the imposition of an overload upon the drawbar of the tractor, but wherein a temporary disconnection between the drawbar and the implement is effected and utilized to disengage the clutch of the tractor.

A still further object of the invention is to provide an attachment as set forth in the preceding objects in which the device may be readily restored to normal operative condition after an overload has actuated the device to disconnect the clutch of the tractor.

These, together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 2 is a vertical central longitudinal section, parts being broken away, taken substantially upon the plane indicated by section line 2—2 of Figure 1, alternative positions of the parts being indicated in full and dotted lines therein;

Figure 3 is a side elevational view, parts being broken away and parts being omitted, showing the application of this invention to a tractor for controlling the clutch actuating pedal of the same;

Figure 7 is a view similar to Figure 3 but of a modified construction;

Figure 8 is a detailed view in horizontal section taken substantially upon the plane indicated by section line 8—8 of Figure 7; and Figure 9 is a detailed view in side elevation, parts being shown in vertical section, of a still further modified construction.

Figure 1:
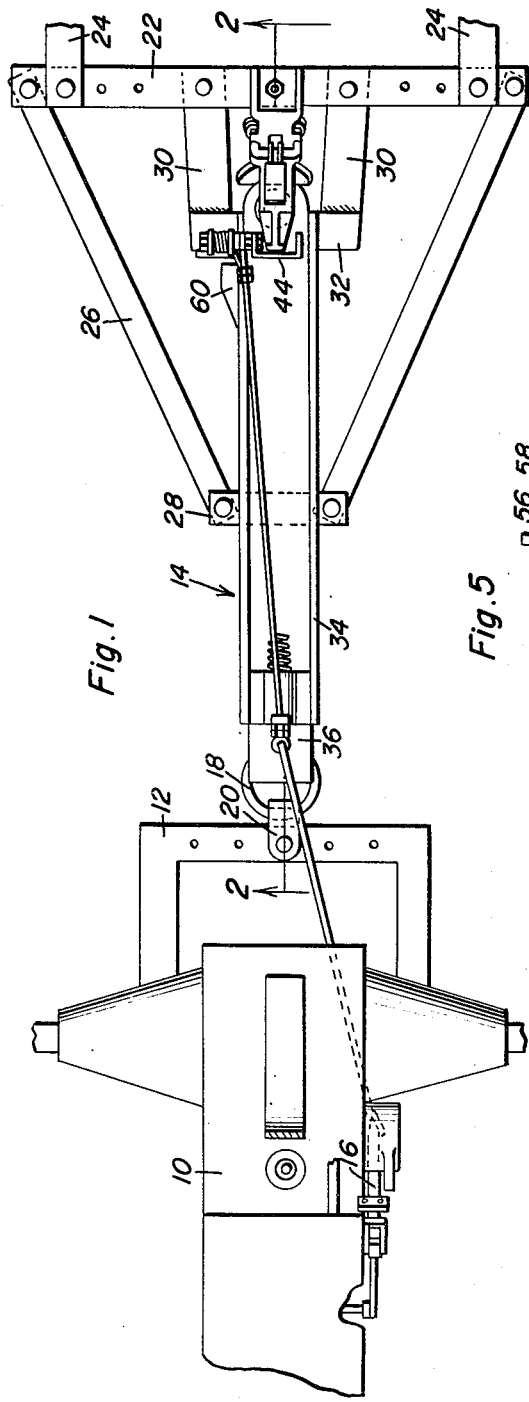
Figure 1 is a top plan view of a portion of a tractor and draw bar and showing the automatic safety coupling of this invention applied thereto.

It has become common practice to provide an overload release coupling between a tractor and an implement drawn thereby in order to disconnect the implement from the tractor when the implement carries a resistance such as a plow striking a stone or stump, in order to prevent damage to the tractor and possible injury to the operator of the same. However, such prior devices usually completely disengage the coupling between the tractor and the implement, causing a considerable delay before the tractor can be recoupled to the implement and the operation of the latter resumed. In the present invention, instead of the coupling being broken between the tractor and the implement, the coupling is caused to have a limited extension of its length when a resistance of a predetermined magnitude is encountered by the implement, and it is a further provision of this invention to utilize this extension in length of the coupling to cause actuation of the tractor clutch pedal whereby the clutch may be disengaged and further progress of the tractor stopped. Therefore, after the condition which necessitated the stoppage of the tractor has been corrected, the operative connection between the tractor and the implement may be quickly restored without necessity for the driver leaving his seat upon the tractor, thereby resulting in a material saving of time and labor.

In the accompanying drawings illustrating by way of example only, a satisfactory manner for applying the principle of this invention, there is shown at 10 a portion of a tractor of any conventional design, the same having a drawbar 12 about which implements of any desired character are adapted to be connected as by a coupling or hitch indicated generally by the numeral 14. As shown in Figure 3, the tractor has a pedal operated clutch control lever 16 of any conventional and known design and which is adapted to be automatically operated by the safety coupling or hitch in accordance with this invention as set forth hereinafter.

The safety coupling 14 comprises a longitudinally extensible tow bar of the construction to be specifically referred to hereinafter, and which is detachably coupled as by a ring 18 to a hook 20 carried by the drawbar 12 of the tractor. At its rear end the frame of the drawbar includes a transverse member 22 to which the implement may be attached in any desired manner as by links or the like 24, the member 22 being braced to the tow bar framework as by forwardly converging brace members 26 secured to a transverse frame member 28. The transverse member 22 is further provided with a pair of laterally spaced forwardly extending members 30 which are joined across their forward ends as by a transverse member 32.

The longitudinally extensible portion of the tow bar frame consists of a beam 34 upon which is slidably mounted an elongated slide 36 to which the above mentioned ring 18 is secured.

Figure 5:
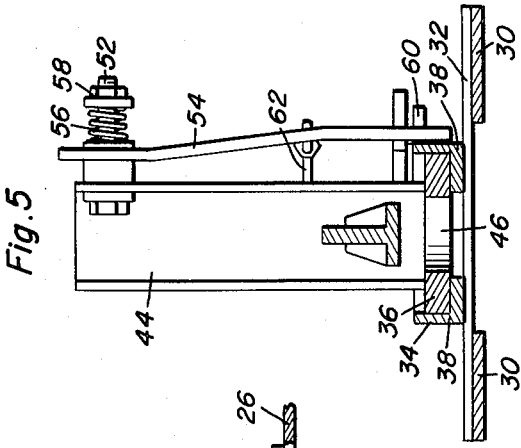
Figure 5 is a vertical, transverse sectional detail view taken substantially upon the plane indicated by section line 5—5 of Figure 2.
Figures 4, 6:
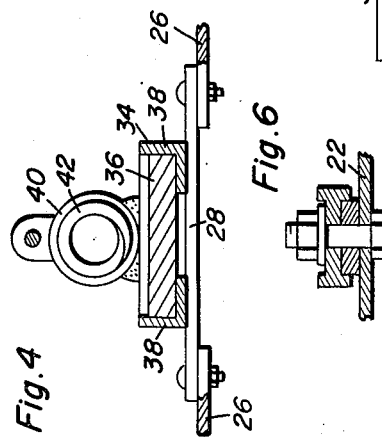
Figure 4 is a vertical, transverse sectional detail view taken substantially upon the plane indicated by section line 4—4 of Figure 2.
Figure 6 is a detailed view in vertical transverse section taken substantially upon the plane indicated by section line 6—6 of Figure 2.

Referring now more particularly to Figures 4 and 5, it will be seen that the stationary beam 34 comprises a pair of angle iron members 38 which are secured in fixed relation as by being welded to the above mentioned transverse member 28 and the transverse member 32. The two channel members 38 thus constitute a channelled bed in which is slidably received the elongated plate 36 comprising the slide of the extensible tow bar construction. Referring particularly to Figure 2, it will be seen that the frame member 34 at its forward end has an upstanding block or abutment member 40 which carries a rearwardly extending buffer spring 42. Adjacent its rear end, the slide 36 has a standard 44 which is positioned to strike the buffer spring 42 when the slide is moved into its forward position, as when the extensible drawbar has been extended to its limit. At its rearmost end the slide is provided with an opening extending vertically therethrough as indicated at 46 for a purpose which will be subsequently set forth.

A latch assembly indicated generally by the numeral 50 is operatively connected with the stationary beam and the slide in such a manner as to normally latch these parts in their retracted position which is the normal operative position of the device when the tractor is towing the implement. However, the latching means is such that when a predetermined overload is applied to the implement, as when the implement is suddenly stopped by striking an obstacle, the latch member releases the slide from the stationary beam and permits the drawbar to elongate until further elongation is stopped by engagement of the member 44 with the buffer spring 42. Prior to this engagement, however, by a mechanism to be now described, the clutch of the tractor is disengaged thus stopping the further application of power to the implement and preventing damage to the tractor or injury to the operator because of a sudden stoppage of the implement.

As shown more clearly in Figure 5, the stop member 44 carried by the slide 36 has a laterally extending bolt 52 to which is pivoted a depending lever 54, a spring 56 and nut 58 serving to retain the lever upon the bolt in proper operative position.

As shown in Figures 1 and 5, a laterally extending lug 60 is provided upon the stationary beam 38 in such position as to obstruct forward movement of the lever 54 with the member 44. Therefore, when the slide 36 is moved forwardly in the beam 34, the lower end of the lever 54 will strike the lugs 60 which will prevent forward travel of the lower end of the lever and cause the lever to pivot about its pivot pin 52. This pivoting movement of the lever is utilized to disengage the tractor clutch in the following manner.

A rod or cable 62 has its rear end secured to the lever 54 and then passes through a guide lug 64 carried by the abutment member 40 and from thence is connected to the extension arm 66 which is clamped or otherwise secured to the clutch lever 16. Consequently, upon rearward swinging movement of the lower end of the lever 54, the cable or rod 62 is moved rearwardly, causing actuation of the clutch lever 16 in a counter-clockwise direction as viewed in Figure 3, thereby disengaging the clutch in the same manner as if the clutch pedal 68 were operated in the usual manner by the driver of the tractor. It will thus be seen that upon initial elongation of the extensible drawbar, the clutch will be disengaged, and the tractor will be brought to a stop by the cushioning action of the member 44 engaging the buffer 42.

As above mentioned, the overload release clutch or latch 50 may be of any conventional design and the principles of this invention are not limited to any particular type of such releasable coupling. Accordingly, the details of this construction are believed to be unnecessary for understanding of the principles of construction and operation of the invention claimed herein. In general, however, it will be observed that this coupling includes a C-shaped latch lever 70 having a latching hoop 72 engageable with the latching opening 46 in the slide 36, the latch lever being pivoted upon a fulcrum pin as at 74 and having a trigger cam 76. A latch keeper 78 is pivoted for vertical swinging movement upon the horizontal portion 80 of a U-bolt 82, the latter having springs 84 for yieldingly urging the latch keeper downwardly. A latch roller assembly 86 is journaled upon the lower portion of the latch keeper and is adapted to engage with the cam surface of the latch lever portion 76 to hold the latch lever in its locking position as shown in Figure 2 under the load of the springs 84. The latch keeper side walls are provided with arcuate slots 90 through which extend a stationary stop pin 92 which limits the upward swinging movement of the latch keeper. A tension spring 94 yieldingly urges the latch keeper into its upper position as shown in Figure 2.

The arrangement is such that when an excessive load is applied to the implement to which the coupling is attached, that the pull of the slide 36 by the tractor will apply a force to the lever 70 which will tend to rotate the same in a counter clockwise direction against the resistance of the spring 84. This, in turn, will cause the cam surface 76 to move from beneath the roller 86 of the keeper, thereby releasing the force of the spring 84 from the lever 70 and permitting the latter to swing in a counter-clockwise direction whereby the latch finger 72 will be released from the opening 46 of the slide and the latter will be permitted to move forwardly in the manner above mentioned. When it is desired to reconnect the device and restore the safety coupling to its operative position, it is merely necessary to back the tractor and thus push the slide 36 towards the right. This movement will in turn cause a clockwise rotation of the latch lever 70, whereby the portion 76 of the same will first rotate the keeper in a counter-clockwise direction as indicated in dotted lines in Figure 2 until the cam portion 76 of the trigger of the latch lever passes beneath the roller 86 and again restores the parts to their coupled position.

It will be observed that this arrangement although a connection is made whereby the safety coupling will cause actuation of the clutch control lever of the tractor, that the latter may also be operated in the usual manner without hindrance from the safety device by means of the foot pedal 68.

In the embodiment of Figure 7, the construction is identical with that previously described except that there is also provided means whereby a clutch actuating lever 100 may be independently operated either by the customary clutch pedal 102 or by a manually operated lever 104 or by the resilient cable 106 which is connected to the safety coupling in the manner previously described. In order to permit operation manually of the clutch lever, there is provided a supporting bracket or standard 108 upon a suitable portion of the tractor 10 and which has a mounting bracket 110 thereon to which the lever 104 is pivotally connected as at 112 intermediate its extremities. A cable, link or the like 113 is secured to the upper end of this lever for manual operation by the driver of the tractor and the lower end of this lever is pivotally connected as at 114 to a link 116. The latter at its rear end is pivoted as at 118 to the above mentioned clutch lever 100 and at its other end is provided with a rod-like extension 120 which is slidably guided in an aperture in the bracket member 108, a compression spring 122 being provided between the link and the bracket as illustrated in Figure 8. It will be observed the cable 106 is connected as by a pin 124 to the above mentioned clutch control lever 100. By this construction the clutch lever may be independently actuated by the foot pedal 102, by the hand lever 104, or by the cable 106 from the safety coupling.

In some forms of tractors, the clutch is operated by a hand lever instead of by a foot pedal. Figure 9 shows a manner for applying the principles of this invention thereto. The same construction of apparatus shown in Figures 7 and 8 is utilized and the same reference numerals are applied in Figure 9. In this form, the cable 106 is passed over guide pulleys 148 and 150, suitably mounted upon the member 12 and the tractor, and is connected at 152 to the clutch actuating hand lever 154 pivoted to the tractor frame at 156. It is important that the pulleys 148, 150 and the cable shall be so disposed that there shall be no tendency to tighten the cable 106 and thus actuate the latch when the tractor is turning corners.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. An overload release safety coupling for tractors comprising an elongated, longitudinally extensible drawbar including a beam adapted for attachment to an object to be drawn, a slide adapted for attachment to a tractor and mounted upon said beam for guided sliding movement longitudinally thereof, a latch assembly releasably securing said beam and slide in longitudinally retracted position for drawing of an object by a tractor and yieldable upon an overload for longitudinal extension of the slide and beam, a resilient buffer carried by said beam for limiting longitudinal extension thereof and preventing separation of the beam and slide, actuating means carried by said beam and slide, means connecting the actuating means with the clutch lever of a tractor, said actuating means being operable to disengage the clutch of a tractor upon extension of the drawbar prior to operation of said resilient buffer said beam having vertical flanges and horizontal flanges extending towards each other, said slide comprising a plate resting upon said horizontal flanges and being guidingly retained between said vertical flanges, said buffer including an abutment secured to the beam at one end and a spring member mounted upon the abutment, a standard secured to and projecting upwardly from the slide at the opposite end thereof from the abutment and positioned for engagement with the spring member when the drawbar is extended to its maximum.

2. An overload release safety coupling for tractors comprising an elongated, longitudinally extensible drawbar including a beam adapted for attachment to an object to be drawn, a slide adapted for attachment to a tractor and mounted upon said beam for guided sliding movement longitudinally thereof, a latch assembly releasably securing said beam and slide in longitudinally retracted position for drawing of an object by a tractor and yieldable upon an overload for longitudinal extension of the slide and beam, a resilient buffer carried by said beam for limiting longitudinal extension thereof and preventing separation of the beam and slide, actuating means carried by said beam and slide, means connecting the actuating means with the clutch lever of a tractor, said actuating means being operable to disengage the clutch of a tractor upon extension of the drawbar prior to operation of said resilient buffer said beam having vertical flanges and horizontal flanges extending towards each other, said slide comprising a plate resting upon said horizontal flanges and being guidingly retained between said vertical flanges, said buffer including an abutment secured to the beam at one end and a spring member mounted upon the abutment, a standard secured to and projecting upwardly from the slide at the opposite end thereof from the abutment and positioned for engagement with the spring member when the drawbar is extended to its maximum, said actuating means including a lug mounted upon and projecting laterally from said beam, a lever pivoted upon a side of the standard and having a portion depending into the path of travel of said lug whereby upon elongation of the drawbar the relative motion of the lug will pivot said lever and actuate the connecting means to disengage the tractor clutch.

References Cited in the file of this patent
UNITED STATES PATENTS

| | | |
|---|---|---|
| 1,457,046 | Stough | May 29, 1923 |
| 1,589,061 | Firari | June 15, 1926 |
| 1,811,267 | Gemberling | June 23, 1931 |
| 2,102,722 | Kortering | Dec. 21, 1937 |